(12) United States Patent
Ye et al.

(10) Patent No.: US 12,474,511 B2
(45) Date of Patent: Nov. 18, 2025

(54) SUB-WAVELENGTH GRATING OPTICAL FILM

(71) Applicant: XIAMEN JUANWEN TECHNOLOGY CO., LTD., Fujian (CN)

(72) Inventors: Zhicheng Ye, Fujian (CN); Jun Zheng, Fujian (CN)

(73) Assignee: XIAMEN JUANWEN TECHNOLOGY CO., LTD., Xiamen (CN)

( * ) Notice: Subject to any disclaimer, the term of this patent is extended or adjusted under 35 U.S.C. 154(b) by 563 days.

(21) Appl. No.: 18/056,714

(22) Filed: Nov. 17, 2022

(65) Prior Publication Data

US 2023/0080327 A1    Mar. 16, 2023

Related U.S. Application Data

(63) Continuation of application No. PCT/CN2020/095320, filed on Jun. 10, 2020.

(30) Foreign Application Priority Data

Jun. 9, 2020    (CN) .......................... 202010518417.2

(51) Int. Cl.
*G02B 5/20* (2006.01)
*G02B 1/02* (2006.01)

(52) U.S. Cl.
CPC ................ *G02B 5/203* (2013.01); *G02B 1/02* (2013.01); *G02B 2207/101* (2013.01)

(58) Field of Classification Search
None
See application file for complete search history.

(56) References Cited

U.S. PATENT DOCUMENTS

| | | | |
|---|---|---|---|
| 2006/0012880 A1* | 1/2006 | Law | ..................... G02B 5/1814 |
| | | | 359/569 |
| 2009/0041971 A1 | 2/2009 | Wang et al. | |
| 2014/0071532 A1* | 3/2014 | Ye | .......................... G02B 5/203 |
| | | | 359/568 |

(Continued)

FOREIGN PATENT DOCUMENTS

| | | |
|---|---|---|
| CN | 101551482 A | 10/2009 |
| CN | 102346269 A | 2/2012 |

*Primary Examiner* — Jyotsna V Dabbi
(74) *Attorney, Agent, or Firm* — Mei & Mark LLP; Manni Li (57) ABSTRACT

A sub-wavelength grating optical film comprises a plurality of one-dimensional periodic grating units repeatedly arranged side by side. Each grating unit with a period of p comprises a first medium, a second medium, a third material, a fourth material, a fifth material, a sixth medium and a seventh medium, wherein the sixth medium serving as a substrate and the seventh medium serving as a covering layer are respectively arranged on bottom and top of each grating unit periodically arranged side by side. By controlling grating period and refractive index, incident blue-violet light meets condition that a diffraction angle in a layer with highest refractive index is smaller than 90 degrees; and by adjusting duty ratio of the grating and the thickness of each layer of material, transmitted light energy of the blue-violet light wave band is the lowest so that harmful blue-violet light is isolated.

12 Claims, 4 Drawing Sheets

(56) References Cited

U.S. PATENT DOCUMENTS

2016/0274281 A1\* 9/2016 Lutolf .................... G02B 6/34
2017/0324217 A1 11/2017 Carras et al.
2019/0143736 A1 5/2019 Kawashita et al.

\* cited by examiner

SUB-WAVELENGTH GRATING OPTICAL FILM

CROSS-REFERENCE TO RELATED APPLICATIONS

The subject application is a continuation of PCT/CN2020/095320 filed on Jun. 10, 2020, which in turn claims priority on Chinese Patent Application No. 202010518417.2 filed on Jun. 9, 2020. The contents and subject matters of the PCT international stage application and Chinese priority application are incorporated herein by reference.

TECHNICAL FIELD

The present invention relates to optical filtering technology, and more particularly, an optical filter film suitable for a display screen of a television, a computer, a mobile phone, etc., and an optical filter film for preventing the transmission of blue-violet light in LED lighting.

BACKGROUND ART

In white LED lighting, people use a blue light source having a wavelength of about 400 nm to 505 nm to generate white light by pumping yellow phosphors. Long-term exposure to blue-violet light is very harmful to the human eyes. In particular, blue-violet light having a wavelength below 450 nm hardly contributes to visual function of the human eyes but is the culprit of human eye diseases. Blue-violet light has a short wavelength, high frequency, and high energy, which can penetrate crystalline lens of the human eyes and reach the retina, resulting in damage to the retina. Long-term overexposure of the human eyes can cause dry eyes, eye pain, impaired vision, macular degeneration, cataracts, etc.

To avoid the damage of blue-violet light to the eyes, an optical filter film technology is mainly used to filter harmful and unhelpful wavelengths. Existing blue light filter films mainly use two solutions, each having their own shortcomings: (1) yellow phosphor is used to absorb blue light, but such method results in an excessively wide filtration spectrum and chromatic aberration, thereby affecting the visual effect; and (2) a multi-layer reflective film made by a vacuum coating technology reflects blue light and prevents the transmission of blue light, but at the same time, it also reflects blue-violet light in the ambient light into the human eyes, which in turn damages the eyes.

SUMMARY OF THE INVENTION

To overcome the deficiencies of the existing technology, the present invention provides a sub-wavelength grating optical film, which solves the problems of the damage to human eyes caused by the inability to effectively filter or prevent the transmission of blue-violet light.

The present invention uses a nano-optical film of a sub-wavelength grating structure, and the blue-violet light is laterally guided or resonantly reflected through reasonable design parameters, thereby reducing the transmission of the blue-violet light.

The technical solution is as follows: to filter out blue-violet light, the present invention provides a sub-wavelength grating optical film comprising a plurality of one-dimensional periodic grating units being repeatedly arranged side by side, wherein each grating unit with a grating period of p comprises a first medium (1), a second medium (2), a third material (3), a fourth material (4), a fifth material (5), a sixth medium (6), and a seventh medium (7); wherein the third material (3) with a thickness or height of h3 and a width of w is arranged on a top of the first medium (1); the fourth material (4) is parallel to a bottom of the first medium (1) and arranged between two adjacent first media (1), and the fourth material (4) has a width of p-w and a height of h4; the fifth material (5) with a height or thickness of h5 and a width of s is respectively arranged on both sides of the first medium (1) and the third material (3), and the second medium (2) is arranged between the adjacent fifth materials (5) which are arranged at intervals; a height relationship among the first medium (1), the third material (3), the fourth material (4), and the fifth material (5) is h5≤h+h3−h4; at least one of the first medium (1), the second medium (2), the third material (3), the fourth material (4), and the fifth material (5) has a different refractive index from other refractive indices; and the grating period p is set such that a diffraction angle of at least one wavelength in incident blue-violet light having a wavelength smaller than a set wavelength, within a medium or material having the highest refractive index among the first medium (1), the second medium (2), the third material (3), the fourth material (4), the fifth material (5), the sixth medium (6) and the seventh medium (7) is less than 90 degrees, thereby weakening at least one wavelength of the blue-violet light band of zero-order transmission.

In the present invention, the blue-violet light band to be filtered may have a wavelength of λ; and an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of λ such that the optical efficiency of transmission and reflection spectra having a wavelength of λ is minimum.

In the present invention, the blue-violet light band to be filtered may have a wavelength of λ; and an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of λ such that the optical efficiencies of the transmission and reflection spectra having the wavelength of λ are minimum and maximum, respectively.

In the present invention, the blue-violet light band to be filtered may have a wavelength of λ; and an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of λ, such that the optical efficiencies of the transmission and reflection spectra having the wavelength of λ are minimum and maximum, respectively.

In the present invention, the first medium (1), the second medium (2), the third material (3), the fourth material (4), and the fifth material (5) may be single-layer or hybrid multi-layer materials.

In the present invention, the third material (3), the fourth material (4), and the fifth material (5) of each of the grating units may be materials having the same refractive index; and at least one of the first medium (1), the second medium (2) and the third material (3) may have a different refractive index from the other two materials.

In the present invention, the grating period may be p≤505 nm; the thickness or height of the first medium (1) may be h=50-800 nm, and the width w of the first medium (1) may be 0.3-0.7 times of the period p; the thickness or height of the third material (3) may be h3=20-150 nm, and the width of the third material (3) may be equal to the width of the first medium; the thickness or height of the fourth material (4) may be h4=20 nm-150 nm, the thickness or height of the fifth material (5) may be equal to that of the first material, and the width of the fifth material (5) may be s=20-150 nm; the first medium (1) may be resin, polycarbonates (PC), polyethylene terephthalate (PET), poly(methyl methacrylate) PMMA, SU8, or photoresist; the second medium (2), the sixth medium (6), and the seventh medium (7) may be glass, resin, PC, PET, PMMA, SU8 or photoresist; and the third material (3), the fourth material (4), and the fifth material (5) may be the same material that is zinc oxide, titanium oxide, zirconium oxide, or silicon nitride.

In the present invention, the second medium (2), the third material (3), the fourth material (4), the fifth material (5), and the seventh medium (7) may have the same refractive index, and the first medium (1) may have a different refractive index from the second medium (2), the third material (3), the fourth material (4), the fifth material (5), and the seventh medium (7).

In the present invention, the refractive index of the first medium (1) may be 2.3, the refractive index of the second medium (2), the sixth medium (6) and the seventh medium (7) may be 1.6, the grating period may be p≤505 nm, the thickness or height of the first medium (1) may be h=50-240 nm, and the width w of the first medium (1) may be 0.3-0.7 times of the period for reducing transmission efficiency of blue-violet light below a wavelength of 450 nm.

In the present invention, the refractive index of the first medium (1) may be 2.3, the refractive index of the second medium (2), the third material (3), the fifth material (5), the sixth medium (6) and the seventh medium (7) may be 1.6, and the fourth material (4) may be titanium oxide, the thickness or height of the fourth material (4) may be h4=10 nm, the grating period may be p≤505 nm, the thickness or height of the first medium (1) may be h=100-300 nm, and the width w of the first medium (1) may be 0.3-0.7 times of the period for reducing transmission efficiency of blue-violet light below a wavelength of 505 nm.

In the present invention, the refractive index of the first medium (1) may be 2.3, the refractive index of the second medium (2), the third material (3), the fourth material (4), the fifth material (5), the sixth medium (6) and the seventh medium (7) may be 1.6, and the third material (3) may be titanium oxide, the grating period may be p≤285 nm, the thickness or height of the first medium (1) may be h=50-200 nm, the width w of the first medium (1) may be 0.3-0.7 times of the period, the thickness or height of the third material (3) may be h3=15 nm, and the width of the third material (3) may be 0.3-0.7 times of the period for reducing transmission efficiency of blue-violet light below a wavelength of 450 nm.

In the present invention, the grating period may be p≤300 nm; the thickness or height of the first medium (1) may be h=50-600 nm, and the width w of the first medium (1) may be 0.3-0.7 times of the period; the thickness or height of the third material (3) may be h3=50-2000 nm, and the width w of the third material (3) may be 0.3-0.7 times of the period; the thickness or height of the fifth material (5) may be h5=100-700 nm, and the width of the fifth material (5) may be s=20-50 nm; and the refractive index of the first medium (1), the second medium (2), the sixth medium (6) and the seventh medium (7) may be 1.5, and the refractive index of the third material (3) and the fifth material (5) may be 2.3 for reducing transmission efficiency of blue-violet light below 450 nm.

The present invention has the following technical effects: compared with the existing technology, the present invention has the following beneficial effects: (1) a very good blue-violet light filtering effect can be achieved through a simple parameter design, and the cost is lower than that of a multi-layer coating technology; and (2) blue-violet light is diffracted and filtered without causing reflection hazards.

In the drawings, reference numbers represent the following components: 1-first medium; 2-second medium; 3-third material; 4-fourth material; 5-fifth material; 6-sixth medium; 7-seventh medium; 8-incident short-wavelength light; 9-incident long-wavelength light; 10-diffracted short-wavelength light; 11-weak short-wavelength transmitted light; and 12-strong long-wavelength transmitted light.

DETAILED DESCRIPTION OF THE INVENTION

In order to make the objectives, technical solutions and advantages of the embodiments of the present invention more clearly, the technical solutions in the embodiments of the present invention are described clearly and completely in conjunction with the accompanying drawings. These embodiments are not inclusive of all the embodiments of the present invention. Based on the embodiments of the present invention, all other embodiments derived by a person of ordinary skill in the art without creative efforts shall fall within the protection scope of the present invention.

Figures 1, 2A, 2B:
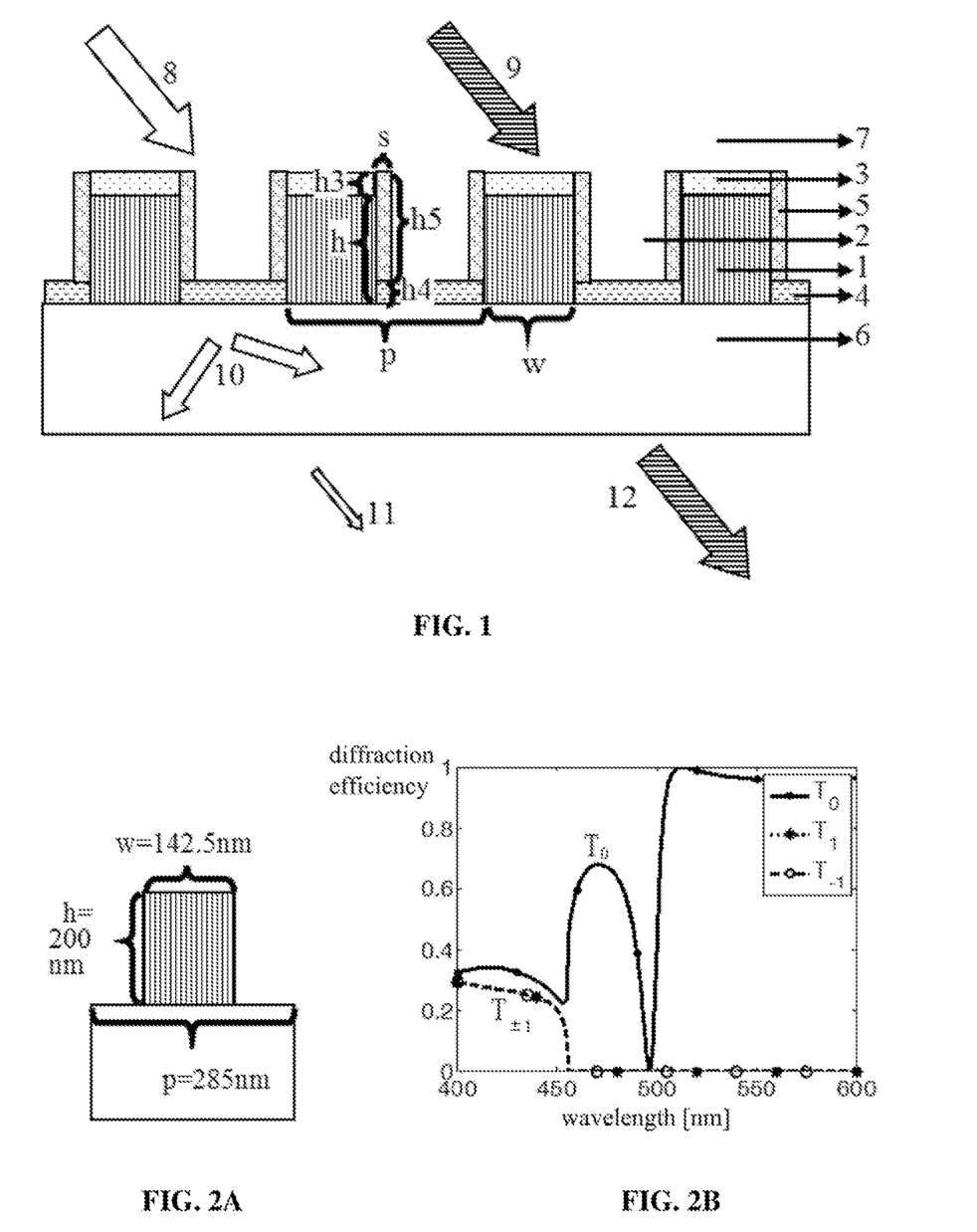
FIG. 1 shows the geometric structure of the sub-wavelength grating optical film of the present invention.
FIGS. 2A and 2B show the structure and simulation result of the diffraction efficiency in the first embodiment of the sub-wavelength grating optical film of the present invention, respectively, where a grating structure comprises only two kinds of media.

In the first embodiment, the sub-wavelength grating optical film has a filtering effect on TE polarized light, and its grating structure only includes two kinds of media: a first medium 1 and a second medium 2.

A schematic structural diagram of the optical film is shown in FIG. 2A. The sub-wavelength grating optical film includes a plurality of one-dimensional periodic grating units which are repeatedly arranged side by side, wherein each grating unit with a grating period of p includes a first medium 1, a second medium 2, a sixth medium 6 and a seventh medium 7; each of the first media 1 which are arranged side by side at equal intervals has a thickness or height of h, and a width of w; the second medium 2 is filled between two adjacent first media 1; the sixth medium 6 serving as a substrate and a seventh medium 7 serving as a covering layer are respectively arranged on the bottom and the top of each of the plurality of grating units which are arranged periodically side by side; the first medium 1 has a different refractive index from that of the second medium; and the grating period p is set such that a diffraction angle of at least one wavelength in incident blue-violet light having a wavelength smaller than a set wavelength, within a medium or material having the highest refractive index among the first medium 1, the second medium 2, the sixth medium 6 and the seventh medium 7 is less than 90 degrees, thereby weakening at least one wavelength of the blue-violet light band of zero-order transmission.

A simulation result using finite element software is shown in FIG. 2B. In the embodiment, the grating period is p=285 nm, the thickness or height of the first medium 1 is h=200 nm, the width of the first medium 1 is w=142.5 nm, the refractive index of the first medium 1 is 2.3, the refractive index of the second medium 2, the sixth medium 6 and the seventh medium 7 is 1.6. The simulation result shows that the transmission efficiency of TE polarized light having a wavelength less than 450 nm is only 33%, and the diffraction efficiencies to the left and right sides of a waveguide formed by the grating structure are about 28%, respectively. The transmission of long-wavelength light is strong, and especially the transmission efficiency of light having a wavelength greater than 500 nm is as high as 97%. The light of 500 nm has relatively low transmission efficiency due to the enhanced resonance reflection of the waveguide formed by the grating, but for a display, will not affect a display effect because red, green and blue light of an LED is very small in light intensity at the proximity of 500 nm. Through simulation, it may also be known that the wavelength that can be diffracted to both sides of the waveguide (a diffraction angle inside the waveguide is less than 90 degrees) can be increased by increasing the period, such that the wavelength of the waveguide resonance also increases. At the time, the filtering effects of blue-violet light can be divided as follows: the diffraction effect (a diffraction angle in the air is less than 90 degrees) in the air weakens the transmission; the diffraction effect in the waveguide weakens the transmission; the enhanced resonance reflection in the waveguide weakens the transmission; and the enhanced resonance absorption in the wavelength weakens the transmission.

Figure 3:
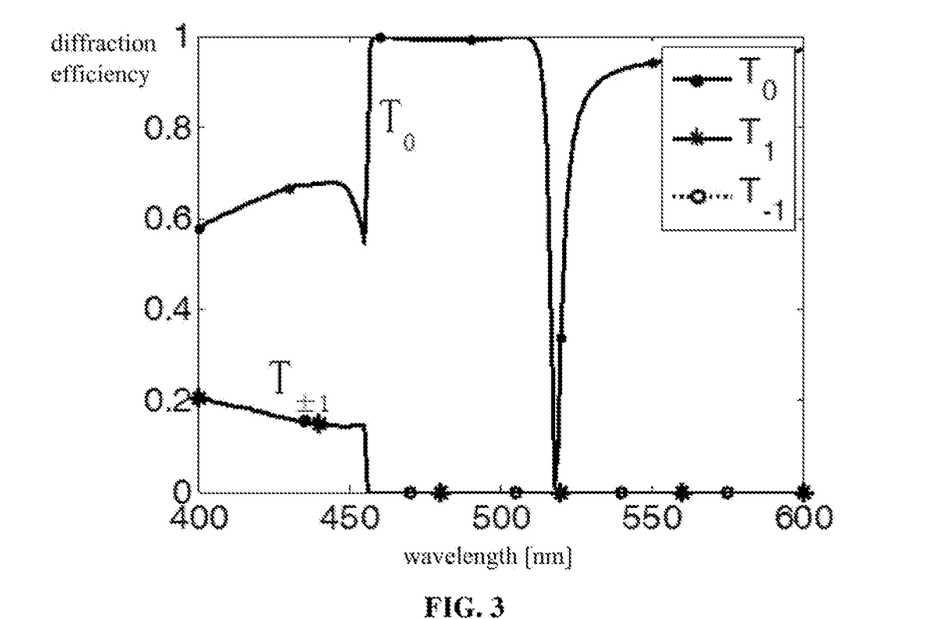
FIG. 3 shows simulation result of the second embodiment of the sub-wavelength grating optical film of the present invention, where the filtering effect of TM polarized light is shown.

In the second embodiment, the sub-wavelength grating optical film has a filtering effect on TM polarized light.

Referring to FIG. 3, based on the first embodiment, incident light waves are changed to TM polarized light, so as to obtain a simulation result of finite element software. The simulation result shows that the transmission efficiency of TM polarized light having a wavelength less than 450 nm is 65%. The transmission of long-wavelength light is mostly greater than 96%. The light transmission efficiency at wavelengths between 450 nm and 518 nm is almost 100% due to the enhancement of the waveguide resonance transmission. The light of 518 nm has relatively low transmission efficiency due to the resonance reflection of the waveguide, but for a display, will not affect a display effect because red, green and blue light of an LED is very small in light intensity at the proximity of 500 nm. The structure can improve the blue light transmission efficiency of 450 nm to 500 nm to ensure the displayed blue light transmission efficiency, and only filter blue-violet light below 450 nm which is more harmful to human eyes. Similarly, the wavelength of interest can be increased or reduced by increasing or reducing the period.

Figure 4:
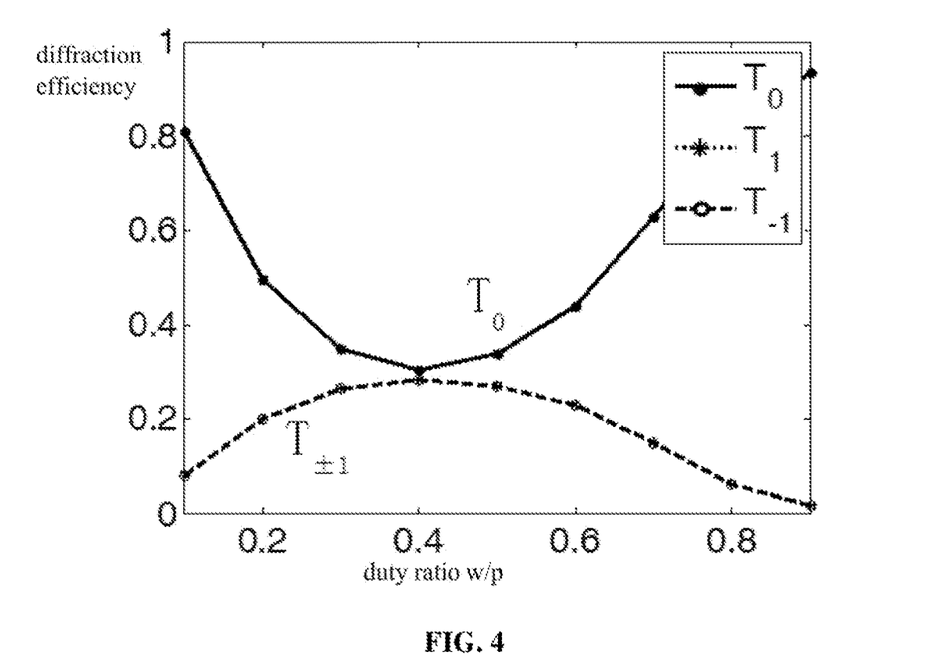
FIG. 4 shows simulation result of the third embodiment of the sub-wavelength grating optical film of the present invention, where the effect of the width of the first medium on the filtering effect is shown.

In the third embodiment, the duty ratio of a grating has an effect on an optical film.

Referring to FIG. 4, based on the first embodiment, incident light having a wavelength of 420 nm is taken to change the duty ratio of the grating, and a simulation result of finite element software is obtained. The simulation result shows that the duty ratio of the grating, that is, a ratio of the width of the first medium in the grating to the grating period, is in a range of 0.3 to 0.5, but the light wave transmission, reflection, and diffraction efficiencies do not change much. Therefore, the optical film is always a better blue-violet light filter film.

Figure 5:
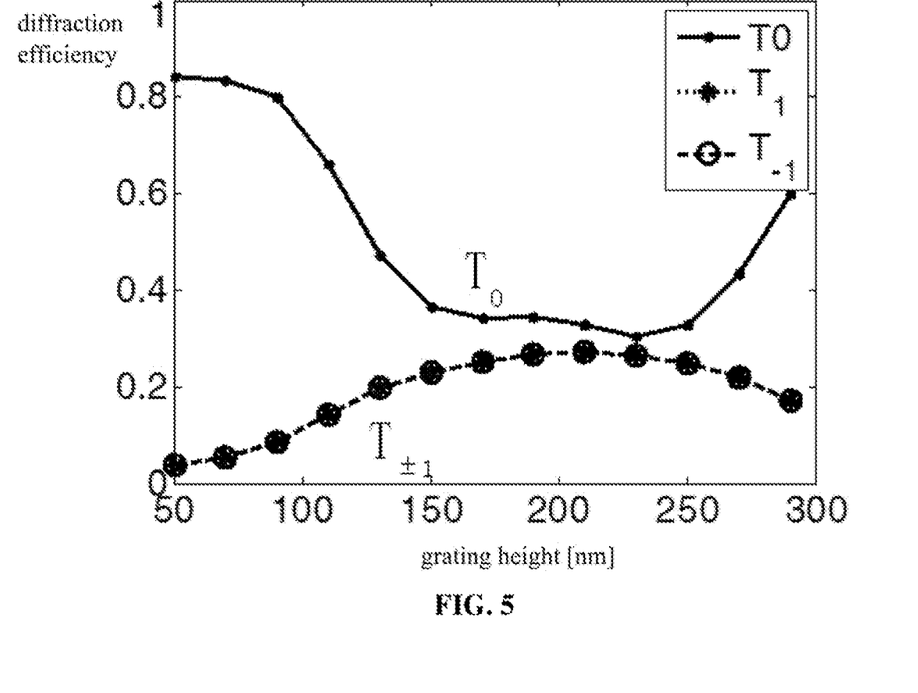
FIG. 5 shows simulation result of the fourth embodiment of the sub-wavelength grating optical film of the present invention, where the effect of the height of the first medium on the filtering effect is shown.

In the fourth embodiment, the height of the first medium has an effect on an optical film.

Referring to FIG. 5, based on the first embodiment, incident light having a wavelength of 420 nm is taken to change the height of the first medium, and a simulation result of finite element software is obtained. The simulation result shows that the height of the grating is in a range of 140 nm to 260 nm when the period is 285 nm, but the light wave transmission, reflection, and diffraction efficiencies do not change much. Therefore, the optical film is always a better blue-violet light filter film.

Figure 6A:
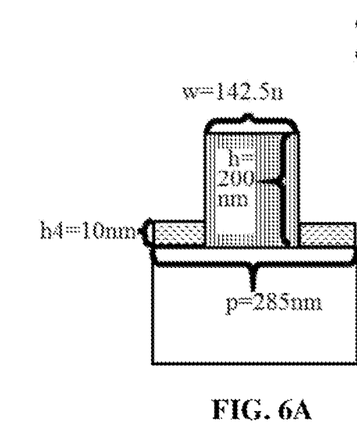
FIGS. 6A and 6B show the grating structure and simulation result of the fifth embodiment of the sub-wavelength grating optical film of the present invention, respectively, where the grating structure comprises a first medium, a second medium, and a fourth material.
Figure 6B:
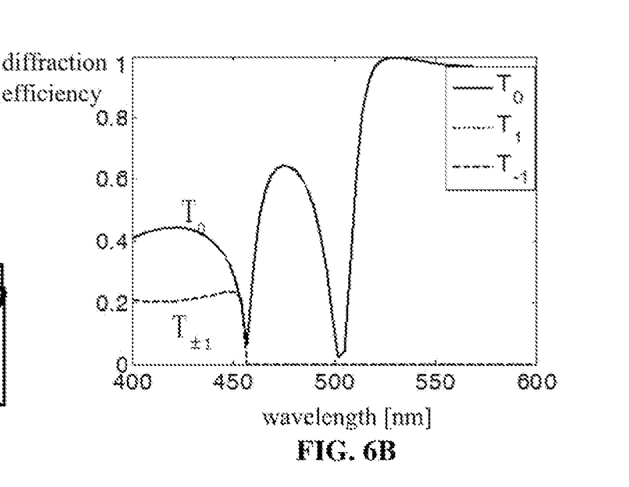

In the fifth embodiment, the sub-wavelength grating optical film has a filtering effect on TE polarized light, and its grating structure only includes a first medium, a second medium and a fourth material.

A schematic structural diagram of the optical film refers to FIG. 6A. Each grating unit with the grating period p includes a first medium 1, a second medium 2, a fourth material 4, a sixth medium 6, and a seventh medium 7.

The fourth material 4 is disposed below the second medium 2 and between two adjacent first media 1; the thickness or height of the fourth material 4 is h4; at least one of the first medium 1, the second medium 2, the fourth material 4, the sixth medium 6 and the seventh medium 7 has a different refractive index from the other materials; and the grating period p is set such that a diffraction angle of at least one wavelength in incident blue-violet light having a wavelength smaller than a set wavelength, within a medium or material having the highest refractive index among the first medium 1, the second medium 2, the fourth material 4, the sixth medium 6 and the seventh medium 7 is less than 90 degrees, thereby weakening at least one wavelength of the blue-violet light band of zero-order transmission.

A simulation result using finite element software refers to FIG. 6B. In a specific embodiment, the grating period is p=285 nm, the thickness or height of the first medium 1 is h=200 nm, and the width of the first medium 1 is w=142.5 nm; the thickness or height of the fourth material is h4=10 nm; the refractive index of the first medium 1 is 2.3, and the refractive index of the second medium 2, the sixth medium 6 and the seventh medium 7 is 1.6; and the fourth material 4 is titanium oxide. The simulation result shows that the transmission efficiency of TE polarized light having a wavelength less than 455 nm is only about 40%, and the diffraction efficiencies to the left and right sides of a waveguide formed by the grating structure are 20%, respectively. The transmission of long-wavelength light is strong, and especially the transmission efficiency of light having a wavelength greater than 500 nm is as high as 95%. The light of 505 nm has relatively low transmission efficiency due to the enhanced resonance reflection of the waveguide, but for a display, will not affect a display effect because red, green and blue light of an LED is very small in light intensity at the proximity of 500 nm.

Figures 7A, 7B:
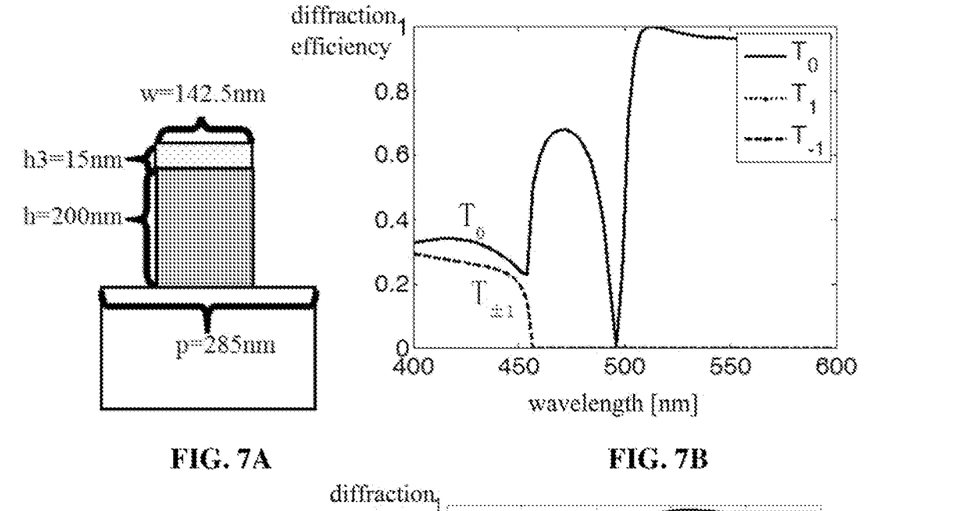
FIGS. 7A and 7B show the grating structure and simulation result of the sixth embodiment of the sub-wavelength grating optical film of the present invention, respectively, where the grating structure comprises a first medium, a second medium, and a third material.

In the sixth embodiment, the sub-wavelength grating optical film has a filtering effect on TE polarized light, and its grating structure includes a first medium, a second medium and a third material.

A schematic structural diagram of the optical film refers to FIG. 7A. Each grating unit with the grating period p includes a first medium 1, a second medium 2, a third material 3, a sixth medium 6 and a seventh medium 7. Each of the grating units further includes the third material 3; the third material 3 having a thickness or height of h3 and a width of w is disposed on the top of the first medium 1; at least one of the first medium 1, the second medium 2, the third material 3, the sixth medium 6 and the seventh medium 7 has a different refractive index from the other materials; and the grating period p is set such that a diffraction angle of at least one wavelength in incident blue-violet light having a wavelength smaller than a set wavelength, within a medium or material having the highest refractive index among the first medium 1, the second medium 2, the third material 3, the sixth medium 6 and the seventh medium 7 is less than 90 degrees, thereby weakening at least one wavelength of the blue-violet light band of zero-order transmission.

A simulation result using finite element software refers to FIG. 7B. In a specific embodiment, the grating period is p=285 nm; the thickness or height of the first medium 1 is h=200 nm, and the width of the first medium 1 is w=142.5 nm; the thickness or height of the third material 3 is h3=15 nm, and the width of the third material 3 is w=142.5 nm; the refractive index of the first medium 1 is 2.3, and the refractive index of the second medium 2, the sixth medium 6 and the seventh medium 7 is 1.6; and the third material 3 is titanium oxide. The simulation result shows that the transmission efficiency of TE polarized light having a wavelength less than 455 nm is less than 35%, and the diffraction efficiencies to the left and right sides are about 20 to 30%, respectively. The transmission of long-wavelength light is strong, and especially the transmission efficiency of light having a wavelength greater than 520 nm is as high as 96%. The light of 495 nm has relatively low transmission efficiency, but for a display, will not affect a display effect because red, green and blue light of an LED is very small in light intensity at the proximity of 500 nm.

Figure 8A:
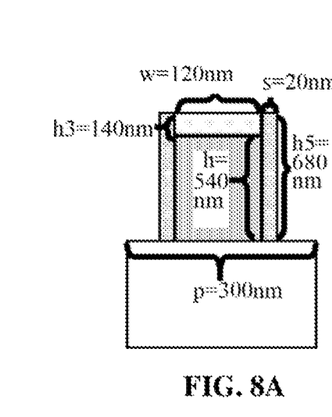
FIGS. 8A and 8B show the grating structure and simulation result of the seventh embodiment of the sub-wavelength grating optical film of the present invention, respectively, where the grating structure comprises a first medium, a second medium, a third material, a fourth material, and a fifth material.
Figure 8B:
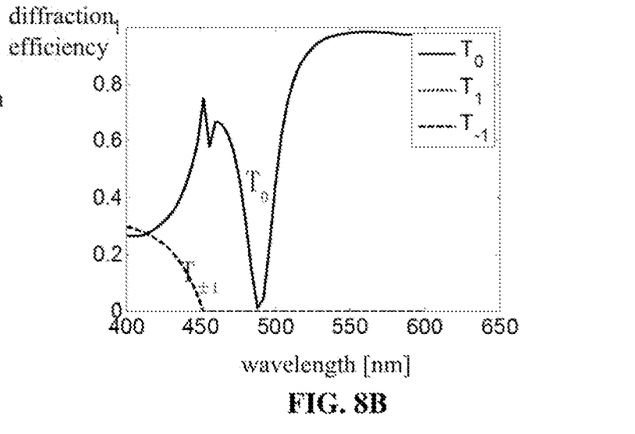

In the seventh embodiment, the sub-wavelength grating optical film has a filtering effect on TE polarized light, and its grating structure includes a first medium, a second medium, a third material, and a fifth material.

A schematic structural diagram of the optical film refers to FIG. 8A. The third material 3 having a thickness or height of h3 and a width of w is disposed on the top of the first medium 1; the fifth material 5 having a width of s and a height or thickness of h5 is disposed on both sides of the first medium 1 and the third material 3, respectively; the second medium 2 is disposed between every two adjacent fifth materials 5 which are arranged at intervals; at least one of the first medium 1, the second medium 2, the third material 3, the fourth material, the fifth material 5, the sixth medium 6 and the seventh medium 7 has a different refractive index from the other materials; and the grating period p is set such that a diffraction angle of at least one wavelength in incident blue-violet light having a wavelength smaller than a set wavelength, within a medium or material having the highest refractive index among the first medium 1, the second medium 2, the third material 3, the fifth material 5, the sixth medium 6 and the seventh medium 7 is less than 90 degrees, thereby weakening at least one wavelength of the blue-violet light band of zero-order transmission.

A simulation result using finite element software refers to FIG. 8B. In a specific embodiment, the grating period is p=300 nm; the thickness or height of the first medium 1 is h=540 nm, and the width of the first medium 1 is w=120 nm; the thickness or height of the third material 3 is h3=h3=140 nm, and the width of the third material 3 is w=120 nm; the thickness or height of the fifth material 5 is h5=680 nm, and the width of the fifth material 5 is s=20 nm; the refractive index of the first medium 1, the second medium 2, the sixth medium 6 and the seventh medium 7 is 1.5; and the refractive index of the third material 3 and the fifth material 5 is 2.3. The simulation result shows that the transmission efficiency of TE polarized light having a wavelength less than 490 nm is less than 60%, and the diffraction efficiencies to the left and right sides are less than 30%, respectively. The transmission of long-wavelength light is strong, and especially the transmission efficiency of light having a wavelength greater than 510 nm is as high as 95%.

Figure 9A:
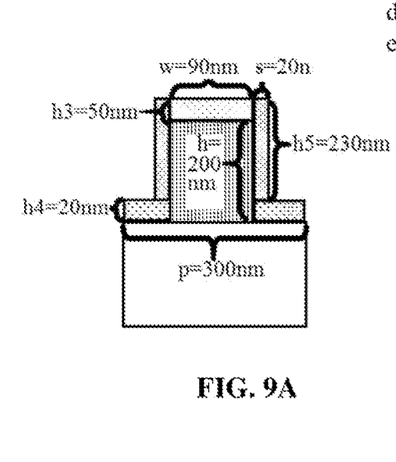
FIGS. 9A and 9B show the grating structure and simulation result diagram of the eighth embodiment of the sub-wavelength grating optical film of the present invention, respectively, where the grating structure comprises a first medium, a second medium, a third material, a fourth material, and a fifth material.
Figure 9B:
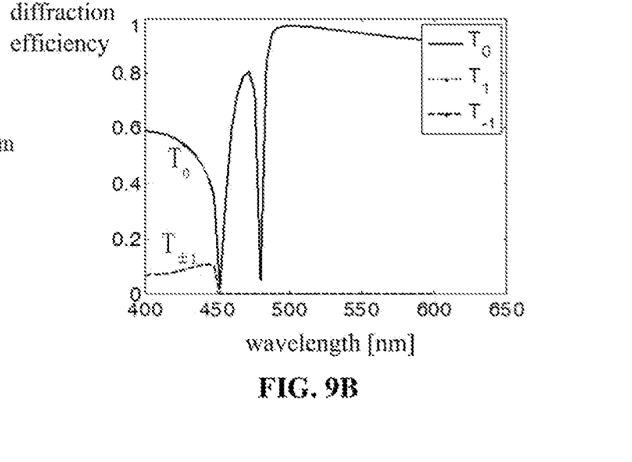

In the eighth embodiment, the sub-wavelength grating optical film has a filtering effect on TE polarized light, and its grating structure includes a first medium, a second medium, a third material, a fourth material and a fifth material.

A schematic structural diagram of the optical film refers to FIG. 9A. The sub-wavelength grating optical film includes a plurality of one-dimensional periodic grating units which are repeatedly arranged side by side. Each grating unit having a grating period p includes a first medium 1, a second medium 2, a third material 3, a fourth material 4, a fifth material 5, a sixth medium 6 and a seventh medium 7, wherein the third material 3 having a height of h3 is disposed on the top of the first medium 1 having a height of h and a width of w; the fifth material 5 having a width of s and a height of h5 is disposed on both sides of the first medium 1 and the third material 3, respectively; the second medium 2 is disposed between two adjacent fifth materials 5 which are arranged at intervals; the fourth material 4 parallel to the bottom of the first medium 1 is arranged between two adjacent first media 1; the fourth material 4 has a width of p-w and a height of h4; the second medium 2 is disposed between two fifth materials 5 which are arranged at intervals; the sixth medium 6 serving as a substrate and the seventh medium 7 serving as a covering layer are respectively disposed on the bottom and the top of each of the plurality of grating units which are arranged periodically side by side; and a height relationship among the first medium 1, the third material 3, the fourth material 4 and the fifth material 5 is h5≤h+h3−h4. At least one of the first medium 1, the second medium 2, the third material 3, the fourth material 4, the fifth material 5, the sixth medium 6 and the seventh medium 7 has a different refractive index from the other materials; and the grating period p is set such that a diffraction angle of at least one wavelength in incident blue-violet light having a wavelength smaller than a set wavelength, within a medium or material having the highest refractive index among the first medium 1, the second medium 2, the third material 3, the fourth material 4, the fifth material 5, the sixth medium 6, and the seventh medium 7 is less than 90 degrees, thereby weakening at least one wavelength of the blue-violet light band of zero-order transmission.

A simulation result using finite element software refers to FIG. 9B. In a specific embodiment, the grating period is p=300 nm; the thickness or height of the first medium 1 is h=200 nm, and the width of the first medium 1 is w=90 nm; the thickness or height of the third material is h3=50 nm, and the width of the third material 3 is w=90 nm; the thickness or height of the fourth material 4 is h4=20 nm, and the width of the fourth material 4 is 210 nm; the thickness or height of the fifth material 5 is h5=230 nm, and the width of the fifth material 5 is s=20 nm; the refractive index of the first medium 1 is 1.7, the refractive index of the second medium 2, the sixth medium 6 and the seventh medium 7 is 1.5, and the refractive index of the third material 3, the fourth material 4 and the fifth material 5 is 2.3. The simulation result shows that the transmission efficiency of TE polarized light having a wavelength less than 450 nm is less than 60%, and the diffraction efficiencies to the left and right sides are about 10%, respectively. The transmission of long-wavelength light is strong, and especially the transmission efficiency of light having a wavelength greater than 490 nm is as high as 95%.

Further, the first medium 1, the second medium 2, the third material 3, the fourth material 4, and the fifth material 5 are single-layer or mixed multi-layer materials.

Further, the third material 3, the fourth material 4, and the fifth material 5 may be metal or dielectric materials, and may be the same type of material as the first medium 1.

Further, the width of the second medium 2 is less than or equal to the grating period p minus the width w of the first medium 1. The thickness or height of the second medium 2 is less than or equal to a sum of the thicknesses or heights of the first medium 1 and the third material 3.

Further, the thickness or height of the fifth material 5 is less than or equal to the thickness or height of the first medium 1 and the third material 3 minus the thickness or height of the fourth material 4.

A working principle of the optical film is as follows: the sub-wavelength grating optical film, by controlling the grating period, the duty ratio, the thickness and refractive index of each layer of material, at least ensures that a resonant wavelength of a waveguide mode of each layer of material at zero degree of incidence is smaller than a wavelength of 550 nm, which is the most sensitive to human eyes, or a central wavelength of green light of a three-primary white light source. Preferably, the resonance wavelength is located at the weakest wavelength of green light of the white light source, so as to ensure that a wavelength at a transmission valley of the zero-order transmitted light at zero degree of incidence is not the most sensitive wavelength of 550 nm or a central wavelength of a green chip of the three-primary white light source. A specific optical principle is as follows: a grating diffraction formula is $k_i \sin \theta_i + mG = k_o \sin \theta_o$ wherein $k_i$ and $k_o$ are wave vectors of incident light and diffracted light, respectively; $\theta_o$ and $\theta_i$ are a diffraction angle and an incident angle, respectively; G is a grating vector; and m is a diffraction order. When the light is incident vertically, i.e., $\theta_i = 0°$, the formula can be evolved as $T = m\lambda/(n^* \sin \theta_o)$, wherein n is a refractive index or an equivalent waveguide refractive index of a medium through which the diffracted light passes. The present invention effectively reduces the transmission efficiency of blue-violet light below a certain wavelength by generating diffracted light through a grating. For example, when the refractive index of the substrate is 1.6, the grating period is required to be 281 nm, in order to reduce the transmission efficiency of light having a wavelength of less than 450 nm. Through numerical simulation, the grating thickness and the duty ratio are further optimized to obtain the highest diffraction efficiency and lowest transmission efficiency of blue-violet light.

Therefore, the method of the present invention is lower in cost compared with a traditional coating mode.

It should be eventually noted that the above embodiments are merely used to illustrate the technical solutions of the present invention, but are not limited thereto. Although the present invention is described in detail with reference to the above embodiments, an ordinary person skilled in the art should understand: the technical solutions described in the foregoing embodiments may be modified, or some of the technical features may be equivalently replaced. However, these modifications and substitutions do not make the corresponding technical solutions depart from the scope of the technical solutions in the embodiments of the present invention.

We claim:

1. A sub-wavelength grating optical film, comprising
a plurality of one-dimensional periodic grating units being repeatedly arranged side by side,
wherein each grating unit with a grating period of p comprises
a first medium (1),
a second medium (2),
a third material (3),
a fourth material (4),
a fifth material (5),
a sixth medium (6), and
a seventh medium (7);
wherein a thickness or a height of the first medium (1) is h; wherein the third material (3) with a thickness or a height of h3 and a width of w is arranged on a top of the first medium (1);
the fourth material (4) is parallel to a bottom of the first medium (1) and arranged between two adjacent first media (1), and the fourth material (4) has a width of p-w and a height of h4;
the fifth material (5) with a height or thickness of h5 and a width of s is respectively arranged on both sides of the first medium (1) and the third material (3), and the second medium (2) is arranged between the adjacent fifth materials (5) which are arranged at intervals;
a height relationship among the first medium (1), the third material (3), the fourth material (4), and the fifth material (5) is h5≤h+h3-h4;
at least one of the first medium (1), the second medium (2), the third material (3), the fourth material (4), and the fifth material (5) has a different refractive index from other refractive indices; and the grating period p is set such that a diffraction angle of at least one wavelength in incident blue-violet light having a wavelength smaller than a set wavelength, within a medium or material having the highest refractive index among the first medium (1), the second medium (2), the third material (3), the fourth material (4), the fifth material (5), the sixth medium (6) and the seventh medium (7) is less than 90 degrees, thereby weakening at least one wavelength of the blue-violet light band of zero-order transmission.

2. The sub-wavelength grating optical film according to claim 1, wherein the blue-violet light band to be filtered has a wavelength of $\lambda$;
an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of $\lambda$, such that optical efficiency of transmission and reflection spectra having the wavelength of $\lambda$ is minimum.

3. The sub-wavelength grating optical film according to claim 1, wherein the blue-violet light band to be filtered has a wavelength of $\lambda$;
an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of $\lambda$, such that optical efficiencies of the transmission and reflection spectra having the wavelength of $\lambda$ are minimum and maximum, respectively.

4. The sub-wavelength grating optical film according to claim 1, wherein the blue-violet light band to be filtered has a wavelength of $\lambda$;
an equivalent wavelength of a grating structure composed of the first medium (1), the second medium (2), the sixth medium (6), the seventh medium (7), the third material (3), the fourth material (4) and the fifth material (5) satisfies a waveguide resonance absorption wavelength of $\lambda$, such that optical efficiencies of the transmission and reflection spectra having the wavelength of $\lambda$ are minimum and maximum, respectively.

5. The sub-wavelength grating optical film according to claim 1, wherein the first medium (1), the second medium (2), the third material (3), the fourth material (4), and the fifth material (5) are single-layer or hybrid multi-layer materials.

6. The sub-wavelength grating optical film according to claim 1, wherein the third material (3), the fourth material (4), and the fifth material (5) of each of the grating units are materials having the same refractive index; and
at least one of the first medium (1), the second medium (2) and the third material (3) has a different refractive index from the other two materials.

7. The sub-wavelength grating optical film according to claim 1, wherein the grating period is p≤505 nm; the thickness or the height of the first medium (1) is h=50-800 nm, and a width of the first medium (1) is 0.3-0.7 times of the period p;
the thickness or the height of the third material (3) is h3=20-150 nm, and the width w of the third material (3) is equal to the width of the first medium;
the thickness or the height of the fourth material (4) is h4=20 nm-150 nm, the thickness or the height of the fifth material (5) is equal to that of the first material, and the width of the fifth material (5) is s=20-150 nm; the first medium (1) is resin, PC, PET, PMMA, SU8, or photoresist;
the second medium (2), the sixth medium (6), and the seventh medium (7) are glass, resin, PC, PET, PMMA, SU8 or photoresist; and the third material (3), the fourth material (4) and the fifth material (5) are same material that is zinc oxide, titanium oxide, zirconium oxide, or silicon nitride.

8. The sub-wavelength grating optical film according to claim 1, wherein the second medium (2), the third material (3), the fourth material (4), the fifth material (5), and the seventh medium (7) have the same refractive index, and the first medium (1) has a different refractive index from the second medium (2), the third material (3), the fourth material (4), the fifth material (5), and the seventh medium (7).

9. The sub-wavelength grating optical film according to claim 1, wherein the refractive index of the first medium (1) is 2.3, the refractive index of the second medium (2), the sixth medium (6) and the seventh medium (7) is 1.6, the grating period is p≤505 nm, the thickness or height of the first medium (1) is h=50-240 nm, and the width w of the first medium (1) is 0.3-0.7 times of the period for reducing transmission efficiency of blue-violet light below a wavelength of 450 nm.

10. The sub-wavelength grating optical film claim 1, wherein the refractive index of the first medium (1) is 2.3, the refractive index of the second medium (2), the third material (3), the fifth material (5), the sixth medium (6) and the seventh medium (7) is 1.6, and the fourth material (4) is titanium oxide, the thickness or height of the fourth material (4) is h4=10 nm, the grating period is p≤505 nm, the thickness or height of the first medium (1) is h=100-300 nm, and the width w of the first medium (1) is 0.3-0.7 times of the period for reducing transmission efficiency of blue-violet light below a wavelength of 505 nm.

11. The sub-wavelength grating optical film according to claim 1, wherein the refractive index of the first medium (1) is 2.3, the refractive index of the second medium (2), the third material (3), the fourth material (4), the fifth material (5), the sixth medium (6) and the seventh medium (7) is 1.6, and the third material (3) is titanium oxide, the grating period is p≤285 nm, the thickness or height of the first medium (1) is h=50-200 nm, the width w of the first medium (1) is 0.3-0.7 times of the period, the thickness or height of the third material (3) is h3=15 nm, and the width of the third material (3) is 0.3-0.7 times of the period for reducing transmission efficiency of blue-violet light below a wavelength of 450 nm.

12. The sub-wavelength grating optical film according to claim 1, wherein the grating period is p≤300 nm; the thickness or height of the first medium (1) is h=50-600 nm, and the width w of the first medium (1) is 0.3-0.7 times of the period; the thickness or height of the third material (3) is h3=50-2000 nm, and the width w of the third material (3) is 0.3-0.7 times of the period; the thickness or height of the fifth material (5) is h5=100-700 nm, and the width of the fifth material (5) is s=20-50 nm; and the refractive index of the first medium (1), the second medium (2), the sixth medium (6) and the seventh medium (7) is 1.5, and the refractive index of the third material (3) and the fifth material (5) is 2.3 for reducing transmission efficiency of blue-violet light below 450 nm.

* * * * *